United States Patent Office.

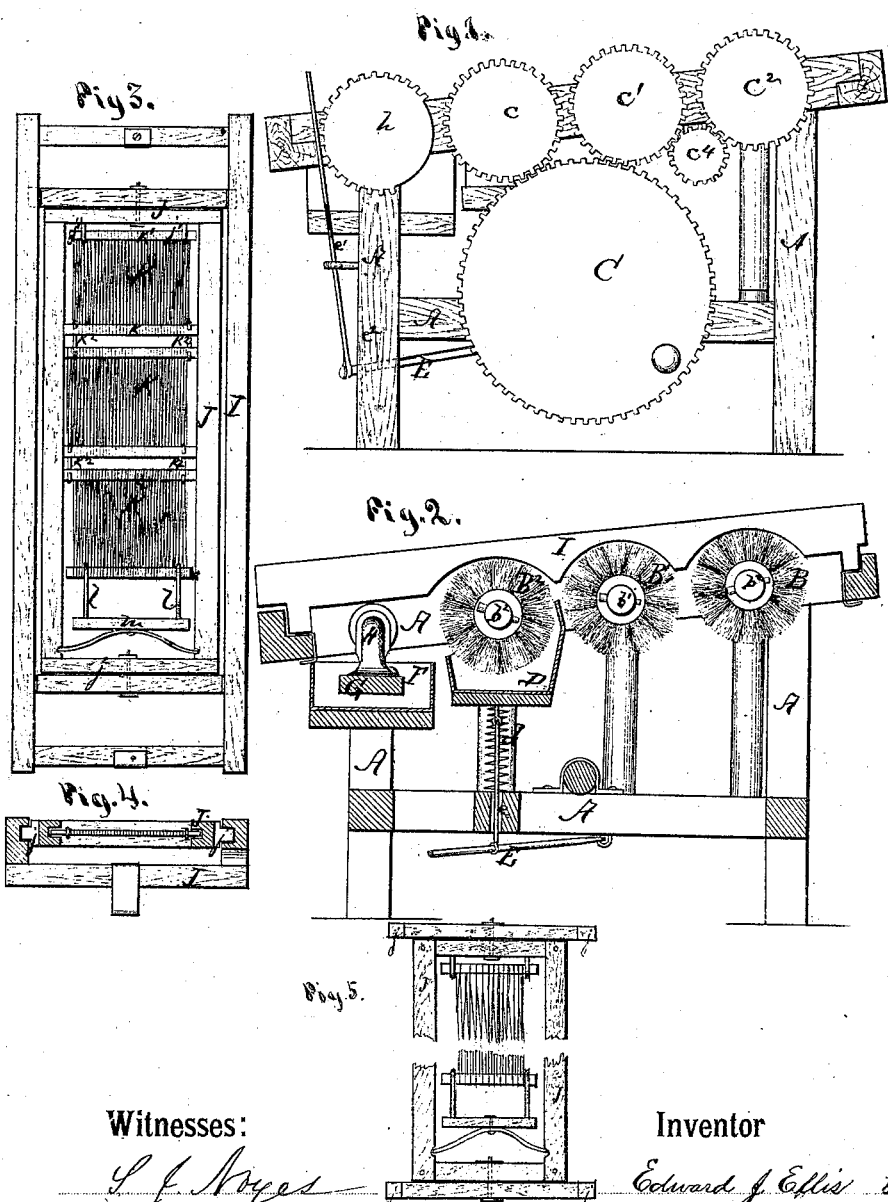

EDWARD J. ELLIS, OF LEWISTON, MAINE.

Letters Patent No. 106,676, dated August 23, 1870.

IMPROVEMENT IN MACHINE FOR VARNISHING AND DRESSING LOOM-HARNESS.

The Schedule referred to in these Letters Patent and making part of the same

*To all whom it may concern:*

Be it known that I, EDWARD J. ELLIS, of Lewiston, in the county of Androscoggin and State of Maine, have invented a new and improved Machine for Varnishing and Dressing Loom-Harness; and I do hereby declare that the following is a full and exact description of the same, reference being had to the accompanying drawing and to the letters of reference marked thereon.

This invention has for its object the production of a machine for varnishing and dressing harnesses for looms, and consists in certain details of construction, which will be fully described hereinafter.

In the drawing—

Figure 1 is a side elevation;

Figure 2, a partial sectional elevation;

Figure 3, a plan view of the sash or frames; and

Figure 4, a sectional end view of the same.

To enable others skilled in the art to make and use my invention, I will now proceed to describe fully its construction and manner of operation.

A A A A represent frame-work of suitable size and shape, by means of which the operating mechanism is supported.

B $B^1$ $B^2$ represent circular brushes upon shafts, $b$ $b^1$ $b^2$, which latter are supported in suitable bearings, and are provided, at the outer ends, with gear-wheels, $c$ $c^1$ $c^2$, as shown.

These gear-wheels receive motion from the main driving-wheel C, the wheels $c^1$ $c^2$ receiving their motion directly from it, while the wheel $c$ is driven by means of an idle-wheel, $c^1$, which engages with the wheel $c^1$. By means of this arrangement all the brushes are caused to revolve in the same direction.

D represents a trough or dish, which is located beneath the brush $B^2$. To its lower side pins, $d$ $d$, are attached, the lower ends of which extend through the cross-beam below. About these pins spiral springs are placed, which serve to sustain the weight of the trough and its contents, and by means of which also the vertical adjustment of the latter is permitted when desired.

To accomplish this adjustment I provide a lever, E, which is connected to the trough D by means of a connecting-rod, $e$, as shown.

To the end of the long arm of the lever is attached an operating bar or rod, $e^1$, which is so located as to be in a convenient position for use by the operator.

In order that the trough may be securely held in any desired position, a rack, $e^2$, is provided, the teeth of which serve to hold the lever E in any desired position.

F also represents a trough or dish, which is fixed into a suitable foundation, as shown, it being so arranged, however, as to be easily removed when desired for cleaning or other purposes.

The trough D, it will be observed, is adjusted vertically to bring its contents in contact with the brushes.

The trough F is differently arranged. It is provided with a pad, G, which is attached to an arm on the shaft H, as shown.

Upon this shaft is placed the gear-wheel $h$, which has a portion of its circumference destitute of teeth, as shown. By means of this arrangement it may be caused to engage with or be free from the other gearing, as may be desired.

I represents a sash or frame, which moves transversely across the main frame, the latter being provided with suitable ways for that purpose.

J represents a supplemental sash or frame, which moves longitudinally in the frame I, the latter being also provided with suitable ways for that purpose.

The sash J is provided with pivoted end pieces, $j$ $j$, which engage with the grooves of the ways of the frame I. It is also itself provided with grooves in its sides, in which rest the ends of the harness-bars.

K represents the harnesses, which are held by the bars $k$ $k^1$.

The end bar, $k^1$, is caught and held by hooks, $j'$ $j'$, upon the frame J, as shown.

The opposite bar, $k$, is united to the bar of the next harness by means of links $k^2$ $k^2$. Any convenient number of harnesses may be thus attached together.

The last bar to the last harness is caught and held by screw-hooks, $l$ $l$, which are fastened to the cross-bar $m$. This cross-bar has attached to it a spring, as shown, the ends of which rest in notches in the sides of the frame.

The operation is as follows:

The harnesses are placed in the frame J, as shown in the drawing, such number being united together as can be conveniently held in it. By means of the spring, which yields sufficiently for the purpose, they are easily removed or put in place, and, when in place, they are securely held without other means of fastening. The frame J is placed in the frame I, and the latter is moved over the brushes. These latter are given a rapid revolution by means of the gearing described, which is actuated by any suitable power, and over them the frame J is caused to move in either direction at will. When it is desired to apply varnish to the brush, the operator causes the segmental gear-wheel $h$ to engage with the adjacent gear-wheel $c$, by which means the shaft H is revolved and the pad G is caused to rise from the trough with its supply of varnish and turn up against the harness above, upon which it leaves, necessarily, a part of its load. The movement of its gear-wheel, however, ceases as soon as it reaches the bottom of the trough again, and it therefore necessarily remains in a state of rest until again brought into operation by the attendant. In laying on the stripe or varnishing the eyes a single brush is used in connection with the apparatus for supplying the varnish and the frame J.

The trough D is especially designed for holding oil, sizing, or other similar material used in finishing harnesses. It is brought into contact with the brush above it by releasing the long arm of the lever E from its contact with the rack, when, of course, the springs beneath will be free to act.

After the harnesses are dressed upon one side, the frame I is moved back from the brushes to one side of the frame, and the side J is revolved by means of its pivoted end pieces, in order to expose the opposite side of the harness to the action of the brushes. It will be observed that, by means of this construction, it is possible to finish the harnesses completely without removing them from the machine.

Having thus fully described my invention,

What I claim as new, and desire to secure by Letters Patent of the United States, is—

1. The combination of the frame J, having pivoted end pieces, with the frame I, as described, for the purpose set forth.

2. The combination of the varnish-pad, shaft, and segmental gearing, as described, for the purpose set forth.

3. The trough D, when combined with the lever E and its connections, and provided with springs, as described, for the purpose set forth.

4. The combination of the frame, gearing, revolving brushes, harness-frames, and troughs, when constructed and operated substantially as described, and for the purpose set forth.

This specification signed and witnessed this 20th day of May, 1870.

EDWARD J. ELLIS.

Witnesses:
 BENJAMIN A. BAILEY,
 DAVID PHETEPLACE.